April 8, 1930.                J. KEENEY                1,753,466
                            FRICTION BRAKE
                          Filed May 22, 1928
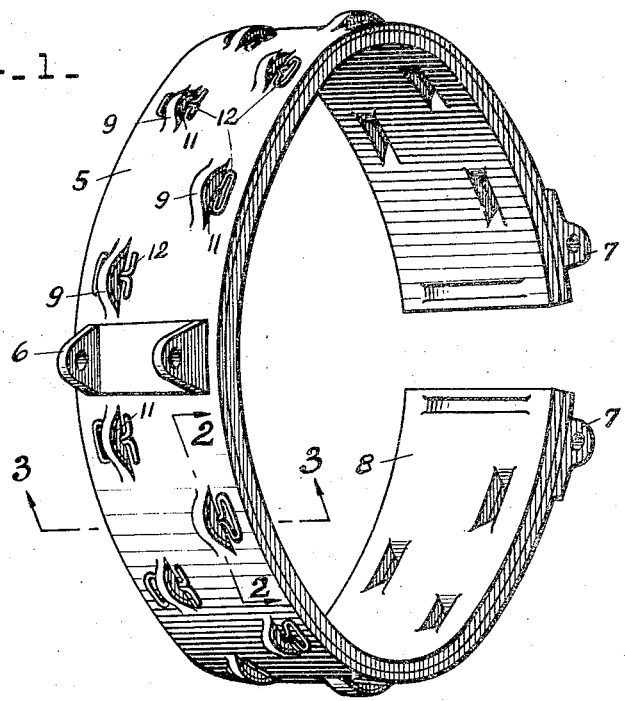
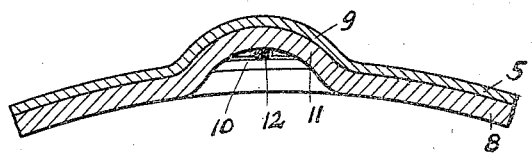
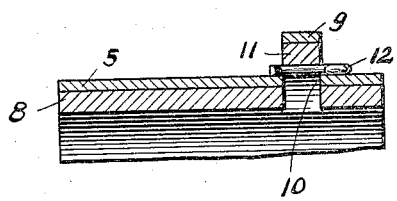
WITNESSES:                                    INVENTOR.
                                              Joseph Keeney,
                                          BY
                                                 ATTORNEY.

Patented Apr. 8, 1930

1,753,466

UNITED STATES PATENT OFFICE

JOSEPH KEENEY, OF MEDIA, PENNSYLVANIA

FRICTION BRAKE

Application filed May 22, 1928. Serial No. 279,672.

My invention relates to friction brakes in which a flexible friction material is secured to a flexible metal band.

The friction material, or brake lining, is ordinarily secured to the bands by means of rivets whose heads are sunk approximately half-way through the lining. When the lining is worn sufficiently to expose the heads of the rivets, they will scrape upon the periphery of the brake drum, wear the drum rapidly, reduce braking efficiency, and squeal loudly when the brakes are applied.

The object of this invention is to overcome these objectional features by providing a brake band to which brake lining may be applied without the use of rivets.

With this and other objects in view, the invention resides in the features of construction and arrangement of parts herein described and claimed and illustrated by the embodiment shown in the accompanying drawing, in which Figure 1 is a perspective view of a braking member constructed in accordance with my invention, Figure 2 an enlarged fragmentary section, taken on line 2—2 on Figure 1, and Figure 3 an enlarged cross-sectional view taken on line 3—3 on Figure 1.

Referring to the drawing, 5 indicates a metallic brake band, 6 its supporting brackets, 7 the connecting lugs and 8 the brake lining. At spaced distances I provide the band with outwardly extending straps 9 which may conveniently be formed by a round nosed punch which cuts two short parallel slits longitudinally of the band and stretches the metal between the slits to form an arcuate strap, leaving a slot 10 underneath each strap. Slits adapted to register with those in the bands are also cut in the lining, thereby forming straps 11 which may be expanded through slots 10 and into the spaces enclosed by straps 9, thereby forming an arch-shaped loop in which a cotter pin 12 or other holding element may be inserted to hold the lining in engagement with the band. While straps 9 assist in stiffening the band, they may be eliminated and the lining secured in place by cotters 12.

When the connecting lugs are spaced from the ends of the band, a transversely disposed strap may be provided adjacent each of its ends to more securely hold the lining against slipping longitudinally. When secured to their bands in this manner, linings will be held in place until worn thin without use of holding devices.

I have shown my invention as applied to a contracting brake, it may be applied to an expanding brake by simply reversing the parts and having the straps extend inwardly instead of outwardly.

In securing brake lining to a brake band in this manner, no fasteners are employed which will eventually abrade the surface of the brake drum and no excess lining is required.

While I have described one application of my invention and have described one method of carrying it into effect, I do not limit myself to the precise construction set forth, but consider that I am at liberty to make such modifications as fairly come within the scope of the appended claims.

I claim:—

1. A friction brake including a metallic band, a series of straps extending therefrom and forming loops, and a lining slitted to form straps disposed to register with the straps in the band and expanded therein and means for holding said straps in said loops.

2. A friction brake including a metallic band, a series of straps extending therefrom and forming loops, a lining slitted to form straps disposed to register with the straps in the band and expanded therein, and fastening means extending through the loops.

3. A friction brake including a metallic band, a series of longitudinal straps extending therefrom and forming loops, straps extending transversely of the band and forming loops, and a lining slitted to form straps disposed to register with the straps on the band and expanded therein, and means for holding said straps in said loops.

4. A friction brake including a metallic band, a series of longitudinal straps extending therefrom and forming loops, straps extending transversely of the band and forming loops, a lining slitted to form straps disposed to register with the straps on the band and expanded therein, and fastening means extending through the loops.

5. A braking member including a metallic band having slots therein, a strip of friction material abutting one side of the band, straps struck out from the strip and extending through the slots, and fastening means extending between the straps and the other side of the band.

In testimony whereof I have signed my name to this specification.

JOSEPH KEENEY.